(12) United States Patent
Gregg et al.

(10) Patent No.: US 7,668,984 B2
(45) Date of Patent: Feb. 23, 2010

(54) LOW LATENCY SEND QUEUES IN I/O ADAPTER HARDWARE

(75) Inventors: Thomas A. Gregg, Highland, NY (US); David Craddock, New Paltz, NY (US); Thomas Schlipf, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 11/621,632

(22) Filed: Jan. 10, 2007

(65) Prior Publication Data

US 2008/0168194 A1 Jul. 10, 2008

(51) Int. Cl.
*G06F 3/00* (2006.01)
*G06F 15/173* (2006.01)
(52) U.S. Cl. ......................... 710/52; 709/238
(58) Field of Classification Search ............... 710/52; 709/238
See application file for complete search history.

(56) References Cited

U.S. PATENT DOCUMENTS

| 2003/0061379 | A1* | 3/2003 | Craddock et al. | 709/238 |
| 2007/0208820 | A1* | 9/2007 | Makhervaks et al. | 709/212 |
| 2008/0168194 | A1* | 7/2008 | Gregg et al. | 710/52 |

* cited by examiner

*Primary Examiner*—Henry W. H. Tsai
*Assistant Examiner*—Hyun Nam
(74) *Attorney, Agent, or Firm*—John E. Campbell

(57) ABSTRACT

Send queues provided in an InfiniBand hardware adapter receive a single transmission from a connected computer system which includes work request information, address vector, and message data. This information is sufficient for the adapter to generate packet header information and to send the requested message, thereby providing a low latency sending mechanism. The system stores completion information in tables each dedicated to one of the send queues.

10 Claims, 6 Drawing Sheets

US 7,668,984 B2

LOW LATENCY SEND QUEUES IN I/O ADAPTER HARDWARE

BACKGROUND OF THE INVENTION

1. Technical Field of the Invention

This invention pertains to low latency message transmission. In particular, this invention provides a solution that allows send queue latency to be reduced.

I/O adapters define queue pairs (QPs) for conveying messaging information from a software consumer to the adapter prior to transmission over a network fabric. Industry standards, such as the InfiniBand™ Architecture Specification available from the InfiniBand® Trade Association and iWarp from the RDMA Consortium, specify that the message information carried on QPs is in the form of a work queue element (WQE) that carries control information pertaining to the message. The above-identified documents are incorporated herein by reference in their entirety. Also, one or more data descriptors point to the message data to be transmitted or the location at which received messages are to be placed.

2. Description of the Prior Art

Low latency message passing is a critical function in high performance computing applications. Typical data exchanges between system memory and InfiniBand adapters, that are required to initiate sending a message over the adapter, consume sizeable amounts of time.

Some SQ applications have a need to reduce the latency incurred during data transfer operations. There is a need for a mechanism to enhance the standard SQ operations so that the lower latencies required by these applications can be achieved.

SUMMARY OF THE INVENTION

An embodiment of the present invention provides send queues implemented in an I/O hardware adapter whereby the message data, address vector and Work Queue Element information are provided to the adapter in a single transfer over the processor local bus. It also provides standard IB completion information and provides hardware protection of key parameters, such as Source LID and Partition Keys. The primary method and structure by which the present inventive embodiment achieves a low latency send is to minimize communication back and forth between the hardware and memory.

An embodiment of the present invention comprises a host system for generating a plurality of data messages to be sent over a network fabric. A hardware adapter coupled to the host system and to the fabric receives at least one of the plurality of data messages. The adapter comprises a plurality of send queues for storing the data messages. The host system transmits individual host packets to the hardware adapter each comprising one of the data messages and each sufficient for the adapter to build a corresponding packet header compatible with the network fabric. The adapter sends the data messages with corresponding packet headers over the network fabric.

Another embodiment of the present invention includes an adapter coupled to a host system and to a network. The hardware adapter comprises send queues for storing request packets, wherein each request packet includes message data and header data sufficient for the adapter to construct a packet having a network compatible packet header and the message data to send the message data with the packet header over the network.

Another embodiment of the present invention comprises a method of sending data packets over a network fabric. Included in the method are steps for generating and providing a plurality of data messages to be sent over the network fabric. Also generated are individual host packets each comprising one of the data messages and each is sufficient to build a corresponding packet header compatible with the network fabric. The data messages are received and stored in a queue of records and then sent over the network each with its corresponding packet header.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BEST MODE FOR CARRYING OUT THE INVENTION

Figure 1:
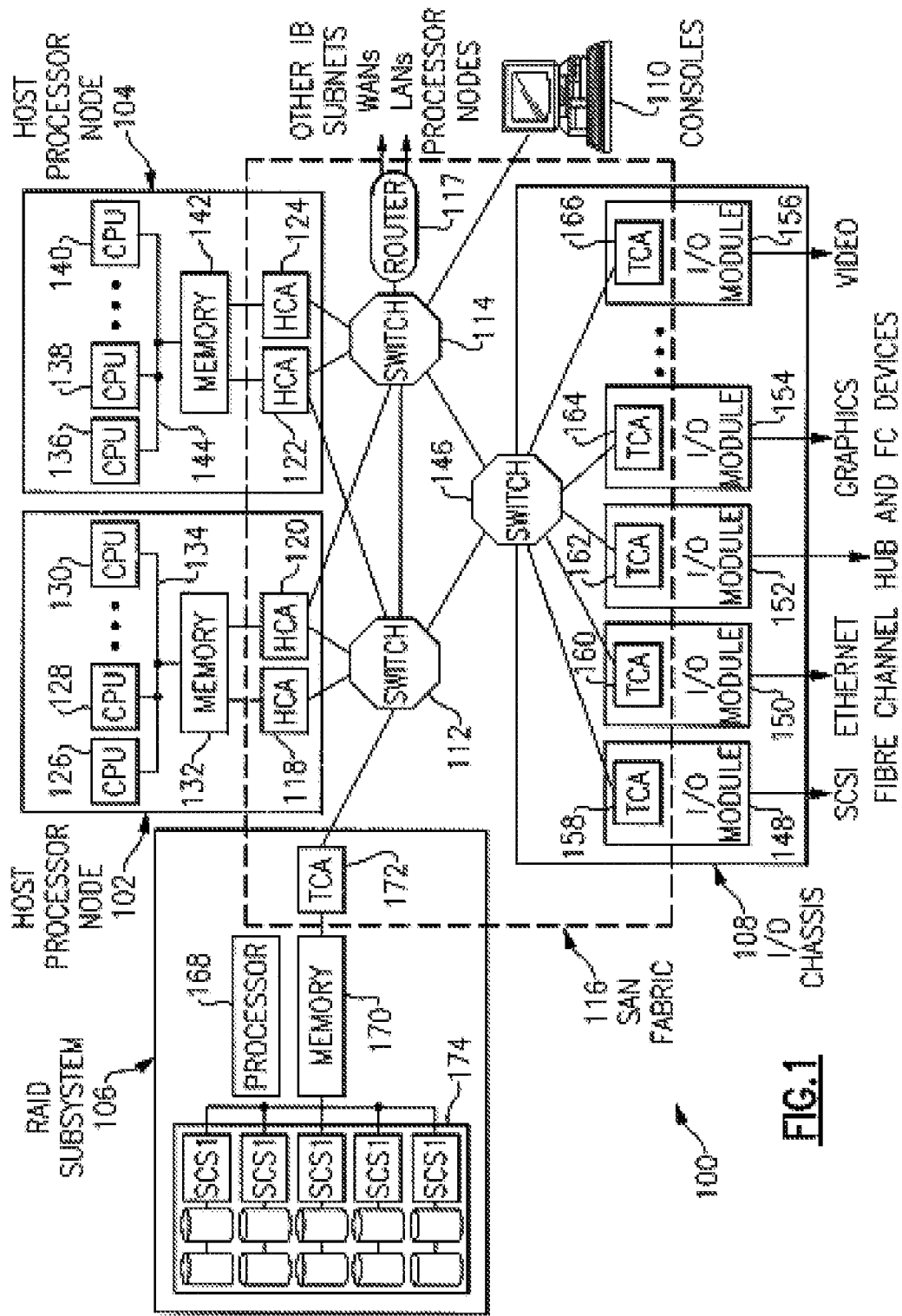
FIG. 1 is a diagram of a distributed computer system that is an exemplary operating environment for embodiments of the present invention.

FIG. 1 is a diagram of a distributed computer system where exemplary embodiments may be implemented. The distributed computer system represented in FIG. 1 takes the form of a SAN 100 and is provided merely for illustrative purposes. Exemplary embodiments of the present invention described below can be implemented on computer systems of numerous other types and configurations. For example, computer systems implementing the exemplary embodiments can range from a small server with one processor and a few input/output (I/O) adapters to massively parallel supercomputer systems with hundreds or thousands of processors and thousands of I/O adapters.

Referring to FIG. 1, a SAN 100 is a high-bandwidth, low-latency network for interconnecting nodes within a distributed computer system. A node is any component attached to one or more links of a network and forming the origin and/or destination of messages within the network. In the example depicted in FIG. 1, the SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can interconnect any number and any type of independent processor nodes, I/O adapter nodes, and I/O device nodes. Any one of the nodes can function as an end node, which is herein defined to be a device that originates or finally consumes messages or packets in SAN 100. In exemplary embodiments, an error handling mechanism in distributed computer systems is present in which the error handling mechanism allows for reliable connection and/or reliable datagram communication between end nodes in distributed computing systems, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN 100. The trailer generally contains control and cyclic redundancy check (CRC) data to verify that packets are not delivered with corrupted contents.

The SAN 100 depicted in FIG. 1 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low-latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes three switches 112, 114, and 146, and router 117. A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In exemplary embodiments, each CA is an endpoint that implements the CA interface in sufficient detail to source or sink packets transmitted on SAN fabric 116. Host processor node 102 contains CAs in the form of host channel adapters (HCAs) 118 and 120. Host processor node 104 contains HCAs 122 and 124. Host processor node 102 also includes central processing units 126-130 and a memory 132 interconnected by bus system 134. Host processor node 104 similarly includes central processing units 136-140 and a memory 142 interconnected by a bus system 144. HCAs 118 and 120 provide a connection from host processor node 102 to switch 112; while HCAs 122 and 124 provide a connection from host processor node 104 to switches 112 and 114.

In exemplary embodiments, an HCA is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In one embodiment, the HCAs and SAN 100 in FIG. 1 provide the I/O and IPC consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules 148-156 take the form of adapter cards. Example adapter cards illustrated in FIG. 1 include a SCSI adapter card for I/O module 148, an adapter card to fibre channel hub and fibre channel arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter to couple the adapter cards to the SAN fabric. These modules contain target channel adapters (TCAs) 158-166. In the example depicted in FIG. 1, the RAID subsystem node 106 includes a processor 168, a memory 170, a TCA 172, and multiple redundant and/or striped storage disk units 174. TCA 172 can be a fully functional HCA.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as HCAs, which enable efficient message passing protocols. SAN 100 is suited to current computing models and is a building block for new forms of I/O and computer cluster communication. Further, SAN 100 in FIG. 1 allows I/O adapter nodes to communicate with each other or to communicate with any of the processor nodes in distributed computer systems. With an I/O adapter attached to the SAN 100 the resulting I/O adapter node has substantially the same communication capability as any host processor node in SAN 100.

In exemplary embodiments, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both utilized for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem TCA 172. The disk I/O adapter examines the command and uses memory semantics to read the data buffer directly from the memory space of the host processor node. After the data buffer is read, the disk I/O adapter employs channel semantics to push an I/O completion message back to the host processor node.

In exemplary embodiments, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
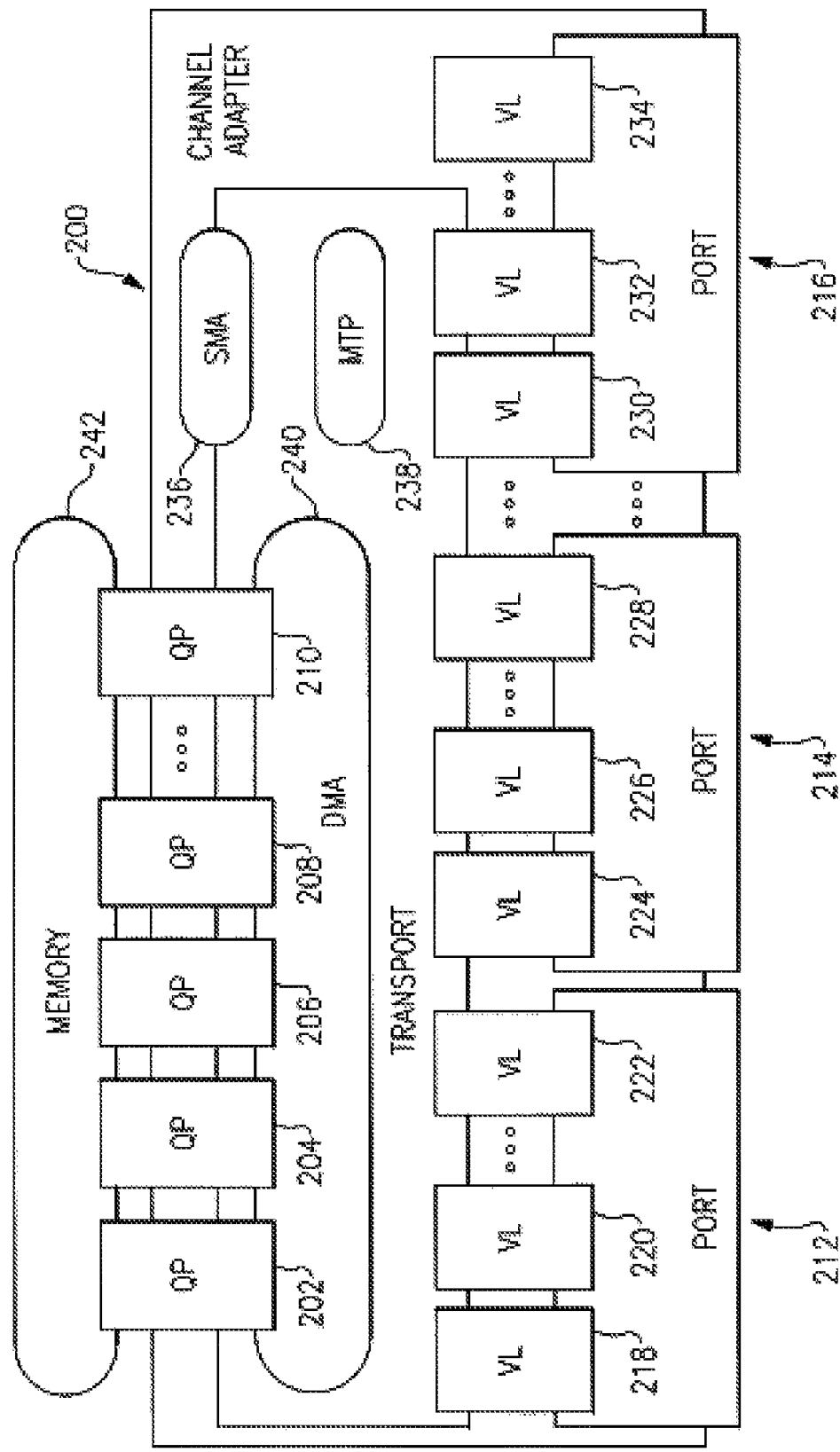
FIG. 2 is a diagram of a host channel adapter that is part of an exemplary operating environment for embodiments of the present invention.

With reference now to FIG. 2, a diagram of an HCA 200 is depicted. HCA 200 shown in FIG. 2 includes a set of QPs 202-210, which is used to transfer messages to the HCA ports 212-216. Buffering of data to HCA ports 212-216 is channeled through virtual lanes (VL) 218-234 where each VL has its own flow control. Subnet manager configures the channel adapter with the local addresses for each physical port, i.e., the port's local identifier (LID). Subnet manager agent (SMA) 236 is the entity that communicates with the subnet manager for the purpose of configuring the channel adapter. Memory translation and protection (MTP) 238 is a mechanism that translates virtual addresses to physical addresses and validates access rights. Direct memory access (DMA) 240 provides for DMA operations using memory 242 with respect to QPs 202-210.

A single channel adapter, such as the HCA 200 shown in FIG. 2, can support thousands of QPs. By contrast, a TCA in an I/O adapter typically supports a much smaller number of QPs. Each QP consists of two work queues, a send queue (SQ) and a receive queue (RQ). The SQ is used to send channel and memory semantic messages. The RQ receives channel semantic messages. A consumer calls an operating system specific programming interface, which is herein referred to as a "verbs interface", to place work requests (WRs) onto a work queue.

Figure 3:
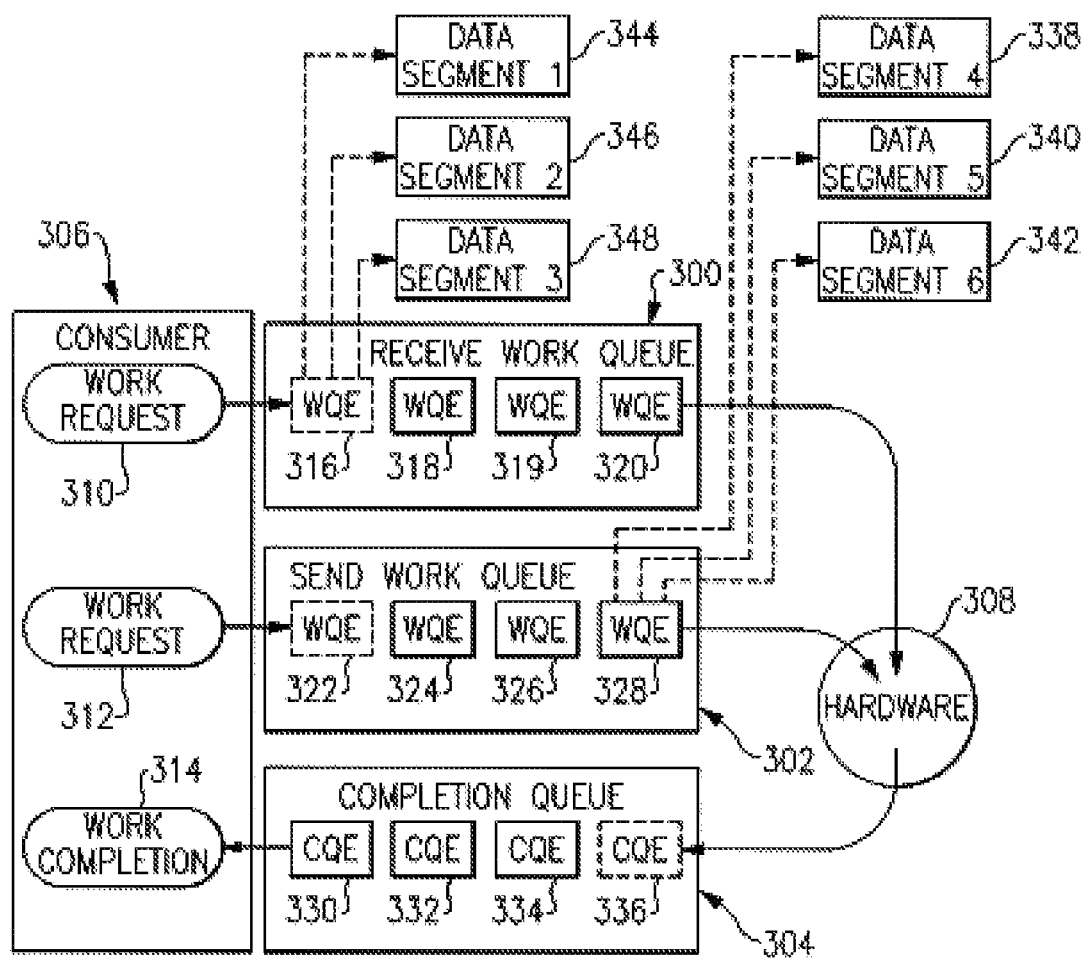
FIG. 3 is a diagram illustrating processing of work requests that is part of an exemplary operating environment for embodiments of the present invention.

With reference now to FIG. 3, a diagram illustrating processing of work requests is depicted. In FIG. 3, RQ 300, SQ 302, and completion queue (CQ) 304 are present for processing requests from and for consumer 306. These requests from consumer 306 are eventually sent to hardware 308. In this example, consumer 306 generates work requests 310 and 312 and receives work completion 314. As shown in FIG. 3, work requests placed onto a work queue are referred to as work queue elements (WQEs).

SQ 302 contains WQEs 322-328, describing data to be transmitted on the SAN fabric. RQ 300 contains WQEs 316-320, describing where to place incoming channel semantic data from the SAN fabric. A WQE is processed by hardware 308 in the HCA. Each QP is managed through a QP context, which is a block of information that pertains to a particular QP, such as the current WQEs, Packet Sequence Numbers, transmission parameters, etc.

The verbs interface also provides a mechanism for retrieving completed work from CQ 304. As shown in FIG. 3, CQ 304 contains completion queue elements (CQEs) 330-336. CQEs contain information about previously completed WQEs. CQ 304 is used to create a single point of completion notification for multiple QPs. A CQE is a data structure on a CQ that describes a completed WQE. The CQE contains sufficient information to determine the QP and specific WQE that completed. A CQ context is a block of information that contains pointers to, length, and other information needed to manage the individual CQs.

Example WRs supported for the SQ 302 shown in FIG. 3 are as follows. A send WR is a channel semantic operation to push a set of local data segments to the data segments referenced by a remote node's receive WQE. For example, WQE 328 contains references to data segment 4 338, data segment 5 340, and data segment 6 342. Each of the send WR's data segments contains a virtually contiguous memory space. The virtual addresses used to reference the local data segments are in the address context of the process that created the local QP.

In exemplary embodiments, RQ 300 shown in FIG. 3 only supports one type of WQE, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address context of the process that created the local QP.

For interprocessor communications, a user-mode software process transfers data through QPs directly from where the buffer resides in memory. In exemplary embodiments, the transfer through the QPs bypasses the operating system and consumes few host instruction cycles. QPs permit zero processor-copy data transfer with no operating system kernel involvement. The zero process-copy data transfer provides for efficient support of high-bandwidth and low-latency communication.

When a QP is created, the QP is set to provide a selected type of transport service. In exemplary embodiments, a distributed computer system implementing the present invention supports four types of transport services: reliable connection, unreliable connection, reliable datagram, and unreliable datagram (UD) service.

Figure 4:
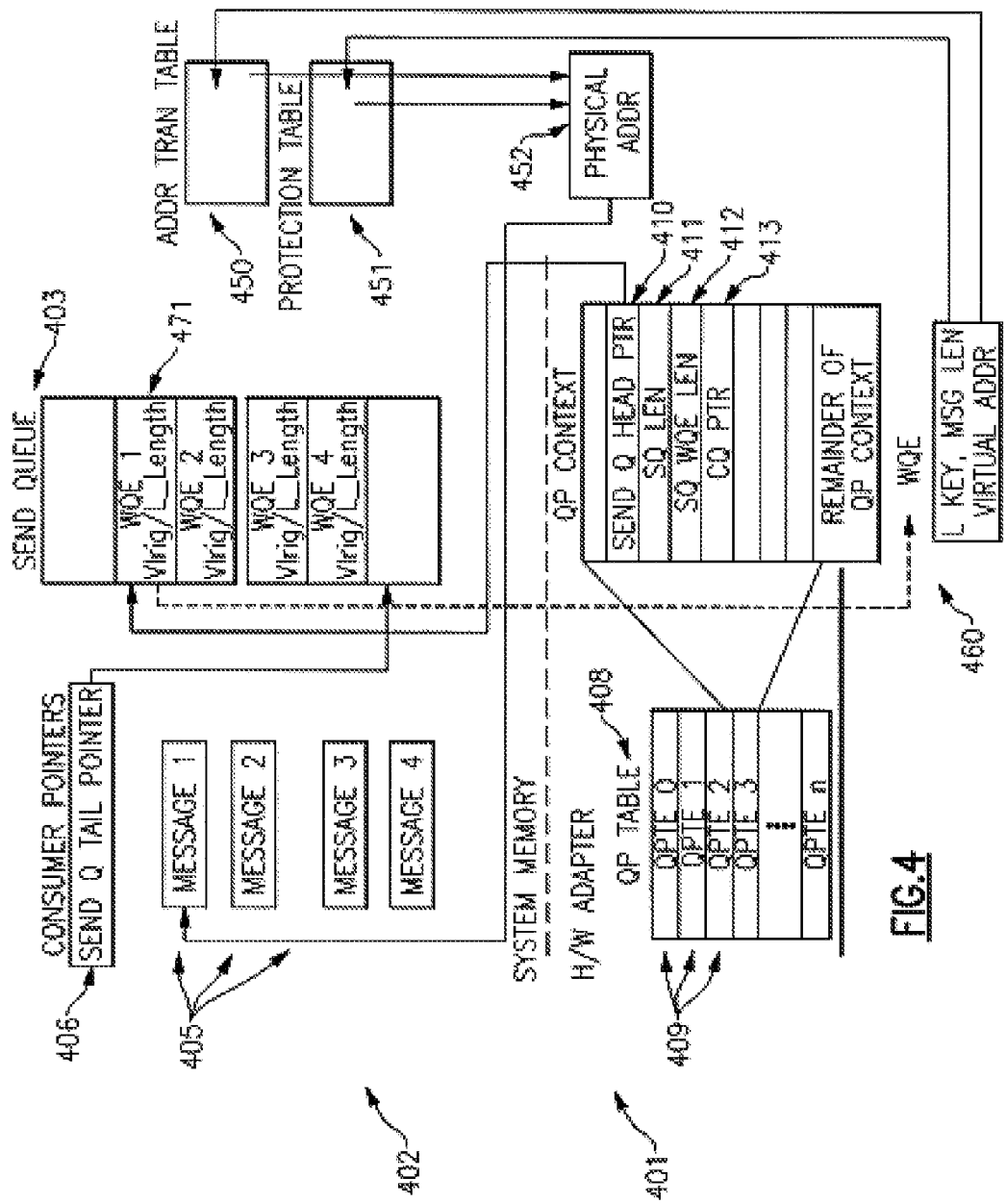
FIG. 4 illustrates prior art standard queue pair handling.

With reference now to FIG. 4, a diagram illustrating standard QP processing for handling send requests is depicted. Shown below the dotted line is an InfiniBand channel adapter 401, frequently referred to simply as "hardware" herein. Above the dotted line is system side memory 402 structured to hold a send queue 403, and messages 405 to be transmitted by the hardware adapter 401. The hardware adapter then sends the messages over a network fabric, such as an InfiniBand fabric, or over an InfiniBand link (not shown). The messages 405 are referenced by WQEs which are indexed in the send queue 403 for sequential processing. The WQEs are labeled WQE 1-4. The send queue comprises the system's list of requests for message sending. Software maintains pointers to the end of the send queue, SQ tail Pointer 406.

The hardware adapter itself also includes a queue pair table 408 with queue pair table entries (QPTE) 0-n 409. Each QPTE can be structured to include, though various other useful data can be stored therein, a pointer to the WQE at the head of the send queue 410, SQ length 411, SQ WQE length 412, CQ PTR 413, and other context information.

In the depicted standard SQ procedure, in order to send a message over the InfiniBand link, as is well known to those skilled in the art of InfiniBand protocols, the system sends an MMIO (Memory Mapped I/O) store message to the hardware which informs the hardware that there is a message, referenced by a WQE, waiting to be sent. The hardware 401 then fetches the WQE at the head of the send queue 471, which queue is located entirely in system memory. The information contained in the fetched WQE 460 includes a virtual address, message length, and L_Key. The adapter uses the L_Key and the virtual address information to access the protection table 451 and address translation table 450 to obtain a physical address 452 of the message. After fetching the message data 405 using the physical address, the hardware builds the packet with information obtained from the fetched WQE 460, that is stored in the adapter, the QP context and the message data.

It will be noted that already there have been several time consuming communications between the system memory and the hardware to generate a packet to be sent over the InfiniBand link, e.g. MMIO message, fetching WQE, fetching message data. Moreover, the address translation step also consumes time and is avoided by use of an embodiment of the present invention. For example, the address translation step typically requires that the hardware access an address translation table in system memory. Oftentimes, a hierarchical address translation table is employed and must be accessed several times by the hardware for a single virtual-to-physical address translation.

Figure 5:
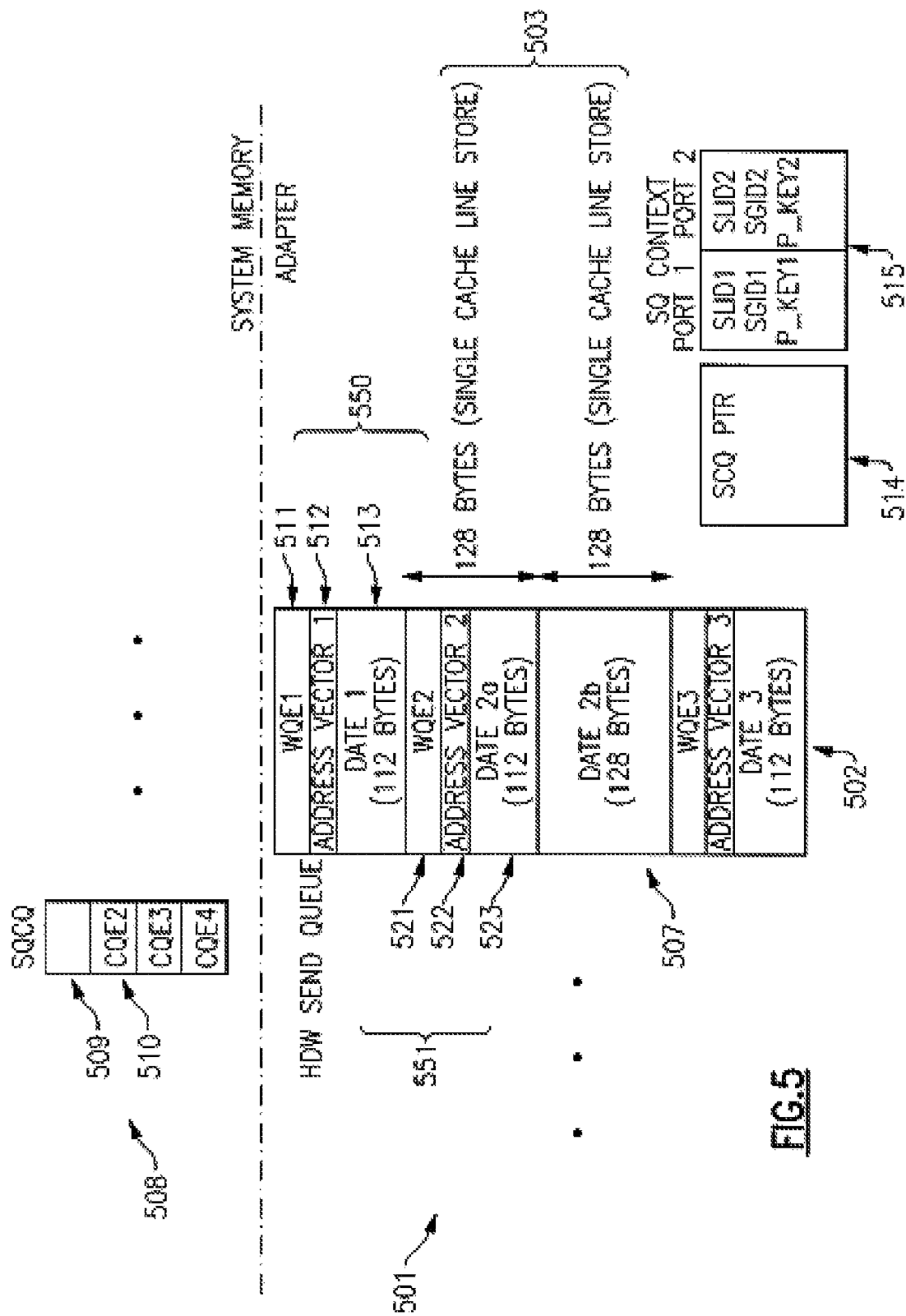
FIG. 5 illustrates an improved send queue configuration according to an embodiment of the present invention.

With reference to FIG. 5, a diagram illustrating an improved apparatus and method for implementing a low latency send queue (LLSQ) 501 of the present invention is depicted. One embodiment of the present invention implements the LLSQ for the unreliable datagram (UD) transport service mentioned above. In an environment comprising thousands of nodes communicating over IB fabrics and routers, the present invention provides the benefit of scalability for these large clusters. For a reliable connected transport service each node requires a QP. That type of configuration starts to breakdown with large clusters because of the demand on memory for the number of QPs required. Also, caching information in the adapter becomes less efficient when data is scattered over a large number of QPs. A single QP implementation according to the present invention provides better cache coherency, less memory usage and less resources required in the adapter.

With reference to the hardware adapter 501 there is illustrated a send queue 502 having storage elements, e.g. 550 and 551, aligned on 128 byte slots. Although one send queue is shown, many send queues are typically configured in an adapter. Each send queue is then mapped to a different system memory space so that processes may be assigned dedicated SQs each with their own memory space. The hardware send queue is arranged and processed circularly, that is, when the adapter reaches the bottom of the list of messages to be sent in the send queue, it then returns to the top to continue processing and sending messages.

In order to send a message over the InfiniBand link (not shown) the system sends a single MMIO store message, as described above, to the hardware (also called "store gather" or burst MMIO) wherein, within 128 bytes of information in a single transfer to the hardware, all the information necessary for the hardware to transmit a message is provided. The Power Architecture™, owned and manufactured by IBM Corp., utilizes 128 byte cache lines. The particular embodiment described herein will, therefore, include reference to 128 byte transfers from system memory, however, the invention is not limited to such an architecture and can be implemented in architectures having standard cache lines of different length. The information provided in the burst, or "store gather," transfer includes WQE data 511 (and 521) and address vector data 512 (and 522) each comprising 8 bytes, for example, and message data comprising 112 bytes 513 (and 523) or, optionally in special cases, an additional 128 bytes of data 507 for a total of 240 bytes of message data. This extended data message length example is illustrated at 503 where extended data stored at Data 2b is appended to the 112 byte Data 2a. The 112 byte message length is useful particularly when smaller control messages are sent among a large cluster, however, in this implementation of LLSQ, the option of adding space for another cache line's worth of message data can be selected when needed by indicating the length of the message data in the WQE sent to the adapter.

As an illustrative example, the WQE data, typically 8 bytes, provided in the burst MMIO includes, in no particular order, an Op Type, such as SEND; a length field indicating length of message data; and Q_Key. The address vector data implemented in the present improved send queue includes an InfiniBand standard DLID and destination QP # to address the target location in the InfiniBand fabric. Thus, the hardware adapter receives in a single MMIO transfer all the information it requires to build a standard IB packet header to transmit the message over the InfiniBand fabric (not shown). Fixed packet header fields are stored in the adapter's QP context 515 and include fields such as Source Local ID (SLID) for identifying the source port of the message; Source Global ID (SGID) for routing the message through an InfiniBand router if necessary; and Partition Key (P_Key), which are all associated with a port on the adapter. If the adapter includes more than one port, it is selected as part of the WQE information and the field values in the context are stored for each associated adapter port.

The send queue completion queues (SQCQ) 508 stored in system memory are each dedicated to one of the send queues and are used to inform the system when the hardware has completed sending a message in order to prevent the system from overwriting an unsent message stored in the hardware send queue. It is uniquely designed in the sense that each is dedicated to one hardware send queue rather than having multiple send queues using one, in order to improve efficiency. When the system is about to send a message it can quickly check the SQCQ with a simple memory read to verify whether a message has been sent from a particular send queue slot prior to writing data to that slot in the send queue. CQE1 509 corresponds to WQE1 511, CQE2 510 corresponds to WQE2 521, etc., although to improve efficiency a CQE does not need to be stored for every WQE. The system explicitly addresses a slot, or a record, on the send queue when writing a burst MMIO or "store gather". After a message has been sent to the fabric by the hardware, the hardware 501 sends an update CQE to the SQCQ, if requested in the WQE by software, indicating which WQE has been sent. The hardware keeps track of where to send the CQE in a Send CQ pointer 514. Typically, software requests to send a CQE every nth message, for example, wherein n could be, for example, approximately one fourth of the number of slots in the SQ, to inform the system when space is available in the send queue. The software requests a CQE by setting a bit in a WQE. Each received CQE identifies a slot in the SQ, using a SQ index, from which a message has been sent to the fabric. Software keeps a record of the last CQE received and determines how many slots are open based on the newly received CQE. The slot number in a CQE indicates that the message in the identified slot and all preceding slots have been transmitted to the fabric, i.e. they have completed and it is safe for software to send a new message to any one of those slots.

Figure 6:
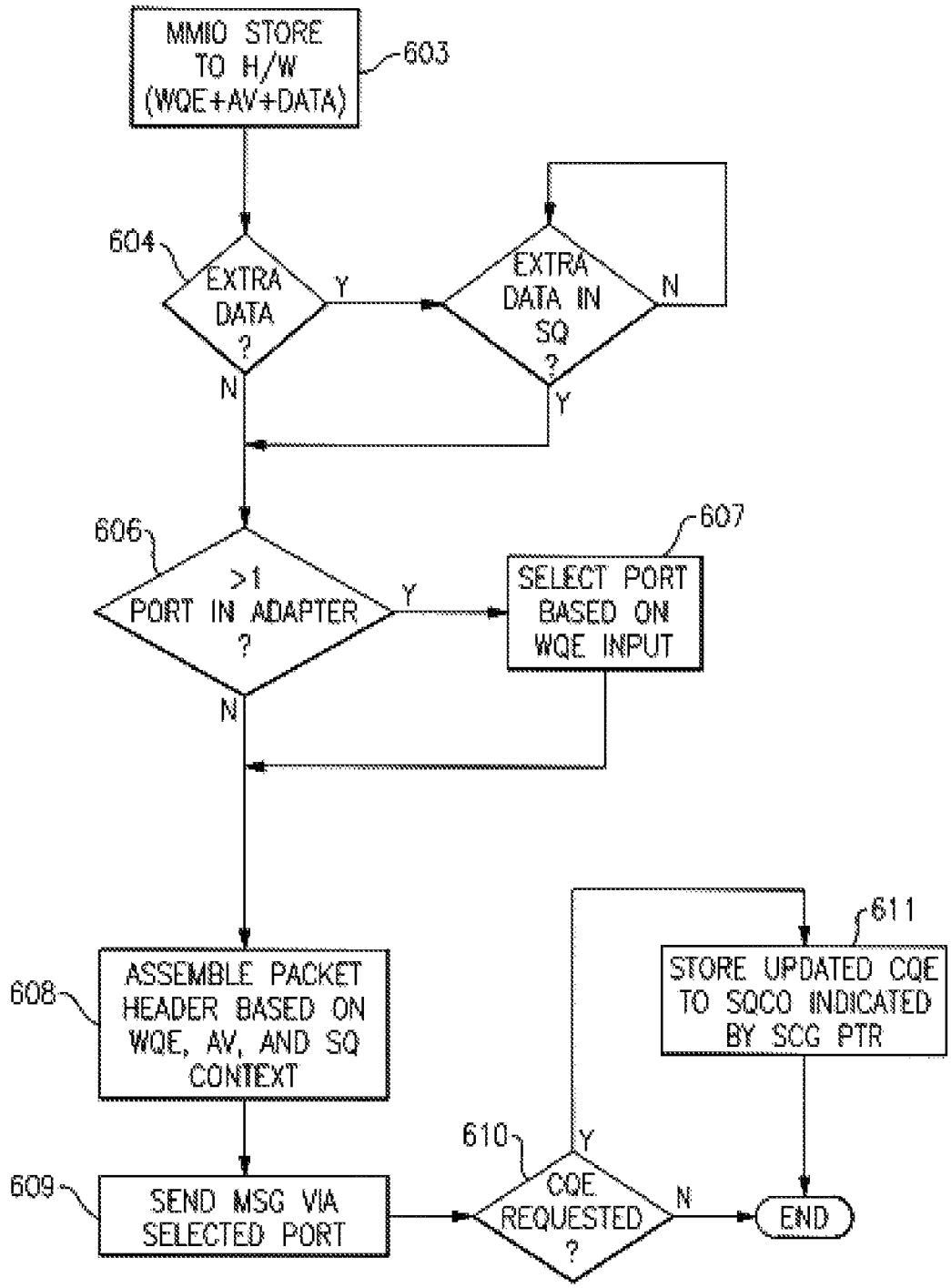
FIG. 6 illustrates a flow chart of an embodiment of the present invention.

With reference to FIG. 6, a flowchart showing implementation of a method of the present inventive embodiment is depicted. At the first step 603 the system sends an MMIO store burst to the hardware including WQE, address vector, and message data information which comprises a request to the hardware to send a message. If the message request exceeds 112 bytes of message data the WQE will indicate this in a length field. At step 604 if the message data requires extra data the hardware will check for the extra data in the SQ at step 605. At step 606, if the hardware includes more than one port then the port will be selected at step 607 based on information provided in the WQE. At step 608, the packet header information will then be assembled by hardware based on information provided in the WQE, address vector and fixed header fields from the SQ context which is stored in the hardware. At step 609, the message is sent via the selected port. At step 610, if the WQE included a request for a CQE update the hardware will store a CQE to the system's SQCQ at the location indicated by the hardware SCQ pointer.

Alternative Embodiments

Devices described herein that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively be embodied by one or more other devices which are not explicitly described as having such functionality/features. Thus, other embodiments need not include the device itself.

Therefore, the foregoing description of the embodiments has been presented for the purposes of illustration and description. It is not intended to be exhaustive or to limit the embodiments to the precise form disclosed. Many modifications and variations are possible in light of the above teaching.

We claim:

1. A method of sending data packets over a network fabric comprising the steps of:
    a computer system generating and providing a plurality of data messages to be sent over the network fabric and individual host packets each comprising one of said plurality of data messages and each sufficient to build a corresponding packet header compatible with the network fabric;
    receiving at least one of the plurality of data messages;
    storing the at least one of the plurality of data messages to be sent over the network fabric;
    sending said one of said plurality of data messages with its corresponding packet header over the network fabric;
    providing a plurality of records each for storing one of said individual host packets;
    sizing the records equal to an amount of data in a cache line of the computer system;
    the computer system generating a host packet including an extended data message larger than each of said plurality of records; and
    assigning at least one additional record to the host packet including the extended data message for storing said extended data message.

2. The method according to claim 1, further comprising the step of:
    inserting work queue element (WQE) data and address vector data into said host packets.

3. The method according to claim 2, further comprising the step of inserting in the WQE data a request for a completion queue element (CQE) for indicating which of said plurality of data messages have been sent.

4. The method according to claim 3, further comprising the step of storing a CQE received in response to said request for a CQE.

5. The method according to claim 2, further comprising the step of inserting port selection data into the WQE.

6. A computer system for sending data packets over a network fabric, the computer system comprising:
    a memory;
    an adaptor in communications with the memory;
    a processor in communications with the memory;
    wherein the computer system is capable of performing a method comprising:
        generating and providing a plurality of data messages to be sent over the network fabric and individual host packets each comprising one of said plurality of data messages and each sufficient to build a corresponding packet header compatible with the network fabric;
        receiving at least one of the plurality of data messages;
        storing the at least one of the plurality of data messages to be sent over the network fabric;
        sending said one of said plurality of data messages with its corresponding packet header over the network fabric;
        providing a plurality of records each for storing one of said individual host packets;
        sizing the records equal to an amount of data in a cache line of the computer system;
        generating a host packet including an extended data message larger than each of said plurality of records; and
        assigning at least one additional record to the host packet including the extended data message for storing said extended data message.

7. The computer system according to claim 6, further comprising inserting work queue element (WQE) data and address vector data into said host packets.

8. The computer system according to claim 7, further comprising inserting in the WQE data a request for a completion queue element (CQE) for indicating which of said plurality of data messages have been sent.

9. The computer system according to claim 8, further comprising storing a CQE received in response to said request for a CQE.

10. The computer system according to claim 7, further comprising inserting port selection data into the WQE.

* * * * *